E. E. GOLD.
ELECTRIC HEATER.
APPLICATION FILED JAN. 8, 1920.
1,416,459.
Patented May 16, 1922.
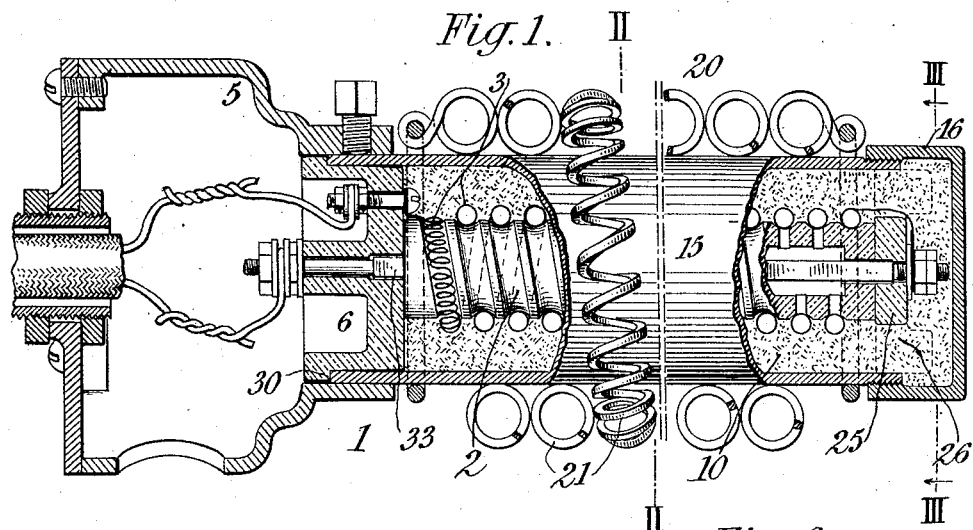
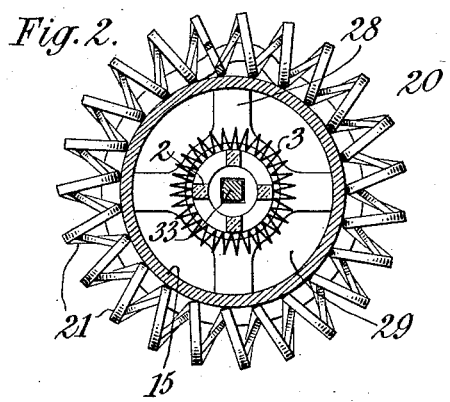
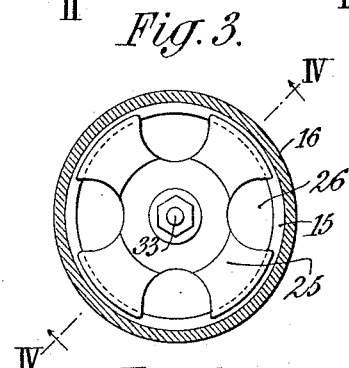
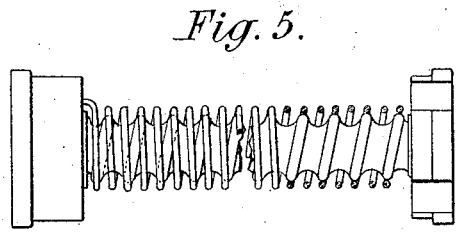
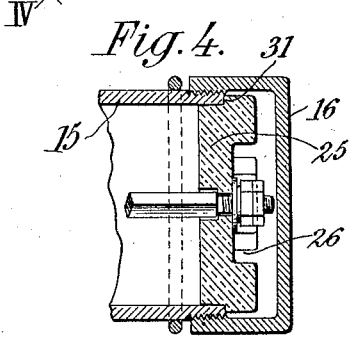
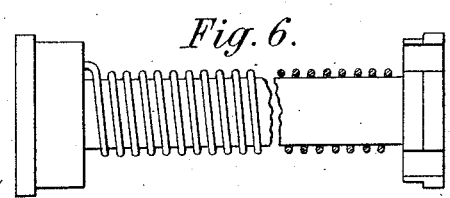
WITNESS
René Bruine
INVENTOR:
Edward E. Gold,
By Attorneys,
Fraser, Dush & Myers

UNITED STATES PATENT OFFICE.

EDWARD E. GOLD, OF NEW YORK, N. Y.

ELECTRIC HEATER.

1,416,459.  Specification of Letters Patent.  Patented May 16, 1922.

Application filed January 8, 1920. Serial No. 350,118.

*To all whom it may concern:*

Be it known that I, EDWARD E. GOLD, a citizen of the United States of America, residing in the borough of Manhattan, city, county, and State of New York, have invented certain new and useful Improvements in Electric Heaters, of which the following is a specification.

This invention relates to electric heaters, more especially of the type employed in passenger vehicles, and dwellings, industrial and office buildings, and the like, and aims to provide improvements therein.

The present invention provides an electric heater wherein the electrical heating element is protected from physical injury and short circuits, and also one in which the construction is such that persons are protected from being burned or shocked by the electrical heating element.

The invention further provides an electric heater wherein the sensation of warmth derived therefrom by persons in its vicinity is greater than in the ordinary electric heater where the heating element is exposed to the air, and consequently provides an electric heater which desirably serves the purpose of a heater for passenger vehicles or dwellings.

The invention further provides an electric heater in which the life of the electrical heating element is prolonged, by reason of its mechanical protection.

An embodiment of the invention is illustrated in the accompanying drawings.

In said drawings—

Figure 1 is a longitudinal sectional view of said embodiment of the invention;

Fig. 2 is a cross section on the line II—II in Fig. 1;

Fig. 3 is a cross section on line III—III, Fig. 1;

Fig. 4 is a longitudinal sectional view on the line IV—IV, Fig. 3.

Figs. 5 and 6 are views showing other styles of heating units which may be used.

In said drawings, numeral 1 designates an electric heater or heating unit of any suitable type, shown as composed of a porcelain or other suitable support 2 having a heating element shown as a coiled wire, or wires 3 thereon of suitably high resistance. In Figs. 2 and 3 the wire 3 is in the form of a spiral of helically wound wire, while in the Figs. 5 and 6 this wire 3 is in the form of a plain spiral. This plain spiral form has the advantage that in case of a break, the spirals hold their position on the support.

The resistance element 3 is connected to a source of electricity in any suitable manner, a junction box 5 of the kind set forth in my U. S. Patent No. 850,924, being preferably employed. In this box splices in the line wire may be made when the ends of such wire become shortened by breaking off of pieces thereof, or lead wires may be interposed between the line wire and the resistance element.

Surrounding the electrical heating unit 1 there is a mass of electrical insulating, heat conducting material 10. This mass of material 10 is preferably of mica in flaky condition, or a mixture of mica in flaky condition and sand in granular condition. Or sand alone may be used, or a mixture of sand and clay, or oil may be used.

Around the electrical heating unit 1, and heat conducting, insulating material 10 there is preferably employed a casing 15. This casing where the material 10 is in divided form is imperforate, or at least closed to the extent of preventing the divided material from passing therethrough and serves as an envelope for said mass of material 10. The casing 15 is most conveniently a tube of common metal pipe. The casing 15 is preferably closed at one end by a plug 6, and at its opposite end by a threaded cap 16, but the casing may be provided at both ends with a plug and may also be provided at both ends with a junction box.

The surface area of the heater in contact with the air is increased in any suitable and well known manner, as indicated at 20. Preferably the casing 15 is surrounded by one or more coils 21 of wire (either flat, square, round, etc.) of good heat conducting material, these coils of wire being conveniently arranged and applied as indicated in my United States Patent, No. 1,265,903.

The surface area of the heater which makes contact with the air may, however, be increased in any other suitable manner, as by corrugations, fins, projections, washers or the like or may even be plain if so desired.

The end of the electrical heating unit 1, opposite the junction box 5 is preferably provided with a disk support 25; this disk support is conveniently provided with recesses or openings 26 through which the material 10, when in divided condition, may be passed to fill the casing 15. Where the heating element is of considerable length one or more intermediate supports 28 may be provided. These supports 28 preferably have wide openings or spaces 29 therein through which the material 10, when in divided condition, may readily pass.

The plug 6 is preferably provided with a shoulder 30 adapted to bear against one end of the casing 15, and the disk 25 is preferably provided with a shoulder 31 adapted to bear against the other end of the casing. A rod 33 passes through the plug 6, disk 25 and intermediate insulating support 2, and nuts engaging threads on the ends of the rods, or equivalent means serve to draw the plug 6 and disk together drawing the shoulders 30 and 31 against the ends of the casing and thereby holding the heating unit together in place within the casing. By loosening the nuts on the end of the rod 33, the plug 6, disk 25 and parts carried on the rod, may be readily removed. This ready removal of the parts permits of the easy replacement of the insulating support, or parts thereof, or of the heating element or wire, in case of a break.

*Theory of operation.*—Because of its relatively great electrical resistance the electrical heating element 3 when traversed by an electric current, causes electric energy to be converted into heat. If surrounded by the heat conducting electrical insulating material 10, this heat is rapidly conducted away from the heating element. The conducting material 10 may even conduct the heat from the heating element more rapidly than the heat is conducted from an electrical resistance heater exposed directly to air.

The material 10, having considerable mass, and this is more especially true in the case of the ensemble consisting of the mass 10 and the casing 15, the temperature at the surface of the mass or casing 15 in contact with the air is considerably less than that of the electrical heating element or wire.

Furthermore, the surface in contact with the air, in the present heater, is much greater than would be the case were the heating element or wire in direct contact with the air. The quantity of air coming into contact with the present heater is therefore greater than would be the case were the electrical heating element or wire exposed directly to the air, and therefore with the present heater there is a relatively great volume of heated air arising from the heater, but of relatively low or mild temperature. The effect upon persons in the vicinity of the heater is therefore very agreeable, and conveys to them a satisfying sensation of warmth.

Moreover, inasmuch as the parts of the heater against which the air comes in contact, are of relatively low temperature, the air does not acquire what may be termed a "burned" condition, and is hence more sanitary and agreeable for breathing purposes.

The inventive ideas herein set forth may receive other mechanical embodiments than those herein specifically illustrated and described.

What is claimed is:—

1. An electrical heater, comprising an insulating support, a resistance wire thereon, a tubular casing, a filler of electrical insulating heat-conducting material, parts at the end of said casing for supporting said insulating support, and a rod passing through said insulating support and end parts and having means thereon for drawing said parts together.

2. An electrical heater, comprising an insulating support, a resistance wire thereon, a tubular casing, a filler of electrical insulating heat-conducting material, parts at the end of said casing for supporting said insulating support, and a rod passing through said insulating support and end parts and having means thereon for drawing said parts together, said end parts having shoulders adapted to abut against the end of said casing.

In witness whereof, I have hereunto signed my name.

EDWARD E. GOLD.

Witness:
J. FOLLIS.